United States Patent

Inagaki et al.

[11] Patent Number: 5,864,769
[45] Date of Patent: Jan. 26, 1999

[54] BRAKE CONTROL SYSTEM FOR VEHICLE

[75] Inventors: Hiromi Inagaki; Yoshimichi Kawamoto; Shinji Suto; Toshio Hayashi, all of Wako, Japan

[73] Assignee: Honda Giken Kogyo Kabushiki Kaisha, Tokyo, Japan

[21] Appl. No.: 680,416

[22] Filed: Jul. 15, 1996

[30] Foreign Application Priority Data

Jul. 14, 1995 [JP] Japan .................................. 7-178428

[51] Int. Cl.$^6$ ...................................................... B60T 8/32
[52] U.S. Cl. ............................... 701/70; 701/72; 701/83; 303/140; 303/146
[58] Field of Search .................................. 701/70, 71, 72, 701/73, 78, 79, 80, 83; 303/140, 146, 147, 148

[56] References Cited

U.S. PATENT DOCUMENTS

| | | | |
|---|---|---|---|
| 4,998,593 | 3/1991 | Karnopp et al. | 701/72 |
| 5,001,636 | 3/1991 | Shiraishi et al. | 701/71 |
| 5,341,297 | 8/1994 | Zomotor et al. | 701/72 |
| 5,686,662 | 11/1997 | Tracht et al. | 303/140 |
| 5,711,024 | 1/1998 | Wanke | 701/72 |
| 5,720,533 | 2/1998 | Pastor et al. | 303/147 |
| 5,746,486 | 5/1998 | Paul et al. | 303/146 |

FOREIGN PATENT DOCUMENTS 39 19 347 A1   2/1990   Germany .
41 23 235 C1  11/1992   Germany .

Primary Examiner—Gary Chin
Attorney, Agent, or Firm—Nikaido, Marmelstein, Murray & Oram LLP

[57] ABSTRACT

In a brake control system for yaw control in a vehicle, the conditions for starting a brake operation are that the absolute value of a deviation between a target yaw rate determined in a target yaw rate determining device and an actual yaw rate detected by a yaw rate detecting device is equal to or greater than a preset deviation value and that the absolute yaw rate is equal to or greater than a preset value. The wheel brake for an outer wheel, during turning of the vehicle, is operated by the yaw control system based on the deviation between both the yaw rates. However, brake control does not occur when both of the yaw rates are the same in direction and are large. Thus, yaw control is conducted immediately when necessary, but the conduction of unnecessary yaw control is avoided, thereby reducing the frequency of the brake operation.

3 Claims, 5 Drawing Sheets

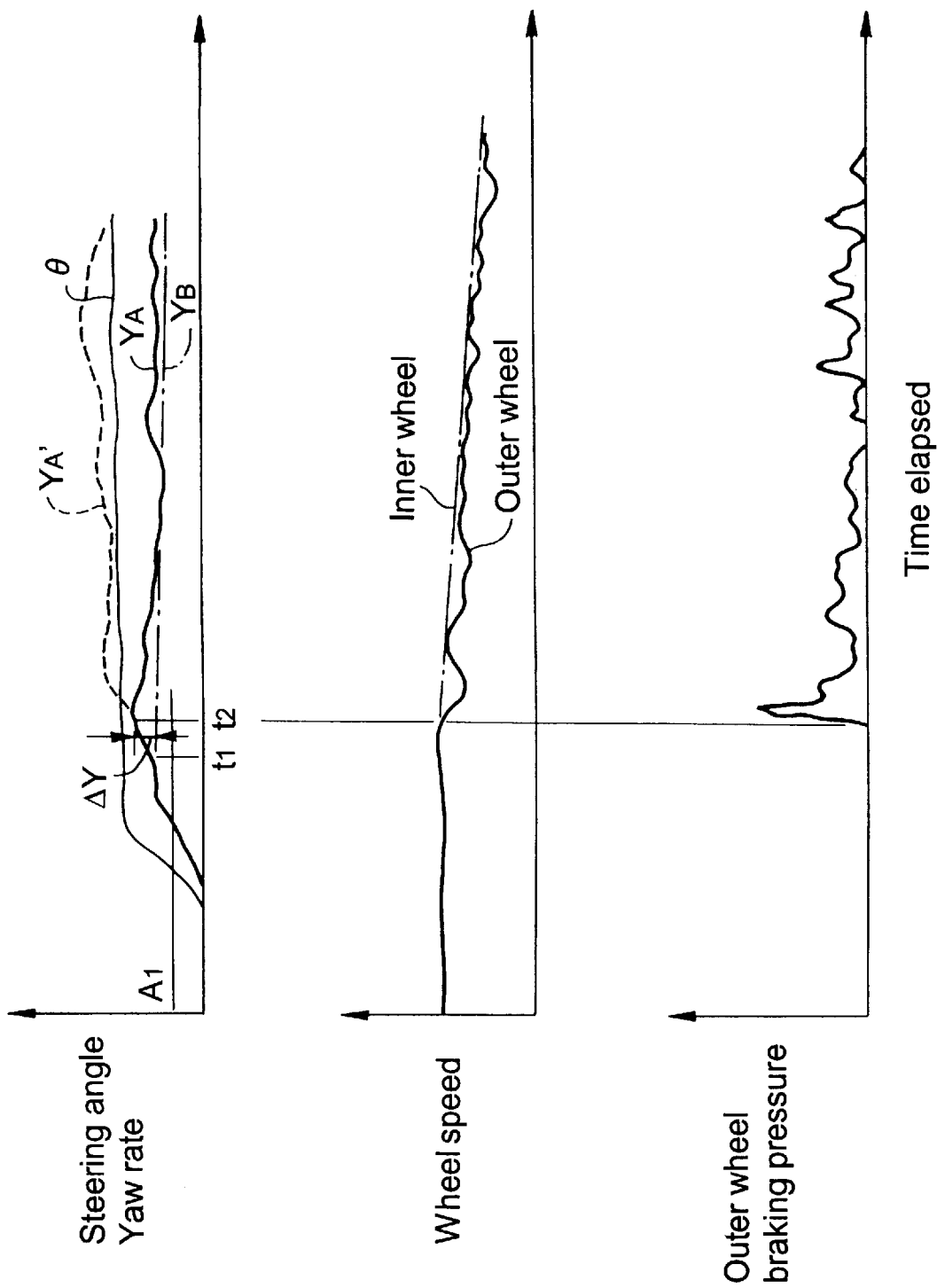

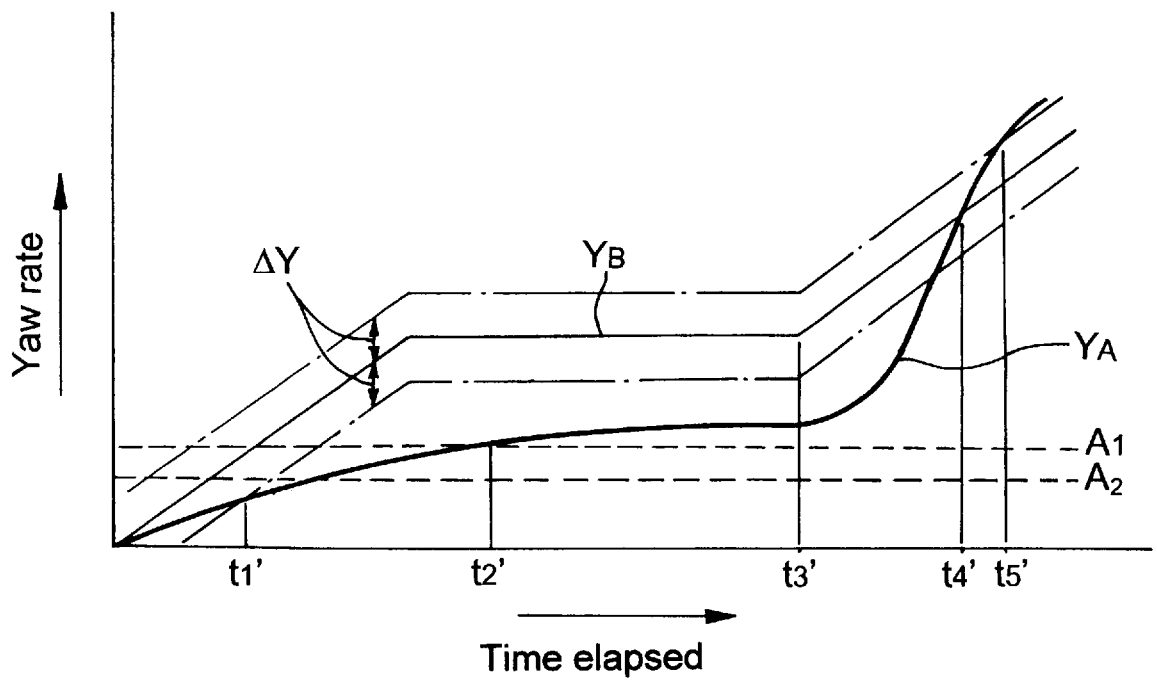

BRAKE CONTROL SYSTEM FOR VEHICLE

BACKGROUND OF THE INVENTION

1. Field of the Invention

The present invention relates to a brake control system for a vehicle and particularly, to a brake control system for a vehicle, in which yaw control can be performed by operation of the vehicle brakes.

2. Description of the Related Art

In a prior art brake control system, for example, in Japanese Patent Application Laid-Open No. 2-70561, a wheel brake for an outer wheel during turning of the vehicle, is operated in order to prevent the vehicle from becoming unstable due to external disturbances, such as variations in the friction coefficient of a road surface, a crosswind or a rut in the road.

In the known brake control system, however, when the deviation between a target yaw rate and an actual yaw rate is increased, a yaw control by the brake operation is started, and the brake operation may be started when it is unnecessary. In other words, when a counter steering is applied, yaw control is unnecessary, but the brake operation is started in response to an increase in the deviation between the target yaw rate and the actual yaw rate.

In the above known brake control system, the wheel brake for the outer wheel during turning of the vehicle, is operated in accordance with the deviation between the target and actual yaw rates. However, when the directions of the target and actual yaw rates are the same as each other, it is necessary to apply a large counter moment, whereas when the directions of the target and actual yaw rates are opposite from each other, a relatively small counter moment may be applied as a result of a partial offset of moments due to the opposite turning direction. If the control of the brake operation is conducted merely in accordance with the deviation, the yaw control is not adapted for the operational state of the vehicle.

SUMMARY OF THE INVENTION

Accordingly, it is a first object of the present invention to provide a brake control system for a vehicle, wherein the yaw control is immediately conducted when necessary, but the conduction of the yaw control is avoided when unnecessary, thereby reducing the frequency of the brake operation.

It is a second object of the present invention to provide a brake control system for a vehicle, wherein the braking control is conducted in accordance with the directions of the target and actual yaw rates, so that the yaw control is adapted for the operational state of the vehicle.

To achieve the above first object, according to a first aspect and feature of the present invention, there is provided a brake control system for a vehicle, comprising a target yaw rate determining means for determining a target yaw rate of the vehicle; a yaw rate detecting means for detecting an actual yaw rate of the vehicle; and a yaw control means for operating a wheel brake for an outer wheel during turning of the vehicle, based upon a deviation between the target yaw rate determined in the target yaw rate determining means and the actual yaw rate detected by the yaw rate detecting means. Conditions for starting the brake operation are that the absolute value of the deviation between the target and actual yaw rates is equal to or greater than a preset deviation value and the absolute value of the actual yaw rate is equal to or greater than a preset value. However, braking control does not occur where the direction of the actual yaw rate is the same as that of the target yaw rate, but the actual yaw rate is smaller than the target yaw rate.

With the first feature of the present invention, when in a so-called plow state in which the directions of the actual and target yaw rates are opposite from each other for an attempt to apply a counter steering, the deviation between the target and actual yaw rates is increased, but the value of the actual yaw rate may be increased in a relatively small number of situations, whereby the frequency of the brake operation can be decreased by the fact that the yaw control is not carried out. On the other hand, when the vehicle is turning with a relatively large yaw rate due to a relatively large friction coefficient of a road surface, the value of the yaw rate is sufficiently large and hence, the yaw control can be immediately performed by the brake operation.

According to the present invention, in addition to the first feature, the yaw control means operates the wheel brake for the outer wheel during turning of the vehicle under the condition for stopping the brake operation when the absolute value of the actual yaw rate detected by the yaw rate detecting means is smaller than a preset value. Thus, when the operational state is changed from a strong under-steering state to an over-steering state by the operation of the vehicle's driver, the stopping of the brake control provided by the yaw control means can be avoided, and the brake control can be started immediately in response to the occurrence of the over-steering state.

To achieve the above second object, according to a second aspect and feature of the present invention, there is provided a brake control system for a vehicle, comprising a target yaw rate determining means for determining a target yaw rate of the vehicle; a yaw rate detecting means for detecting an actual yaw rate of the vehicle; and a yaw control means which operates a wheel brake for an outer wheel during turning of the vehicle, based upon a deviation between the target yaw rate determined in the target yaw rate determining means and the actual yaw rate detected by the yaw rate detecting means. The system determines a brake operation control quantity with respect to the deviation at a smaller value when the directions of the target and actual yaw rates are opposite from each other, than when the directions of the target and actual yaw rates are the same. However, braking control does not occur when the direction of the actual yaw rate is the same as that of the target yaw rate and the actual yaw rate is smaller than the target yaw rate.

With the second feature of the present invention, the brake operation control quantity can be changed in response to the situation where the directions of the target and actual yaw rates are opposite to each other and the required counter moment is relatively small, and in response to the situation where the directions of the target and actual yaw rates are the same and the required counter moment is relatively large, thereby performing an appropriate brake control suitable for the operational state of the vehicle. Specifically, when in a so-called plow state in which the directions of the target and actual yaw rates are opposite from each other, the necessary counter moment may be relatively small due to the partial offset of moments. In a so-called spinning state, the necessary counter moment is relatively large due to the summing of the moments. Thus, by determining the brake operation control quantity at the smaller value relative to the deviation when the directions of the target and actual yaw rates are opposite from each other, than when the directions of the target and actual yaw rates are the same, it is possible to vary the brake operation control quantity to a larger or smaller value in correspondence to the magnitude of the necessary counter moment.

The above and other objects, features and advantages of the invention will become apparent from the following detailed description of a preferred embodiment taken in conjunction with the accompanying drawings.

BRIEF DESCRIPTION OF THE DRAWINGS

FIG. 4 is a time chart.

FIG. 5 is a diagram illustrating one example of the variation in yaw rate with the passage of time.

DETAILED DESCRIPTION OF THE PREFERRED EMBODIMENTS

Figure 1:
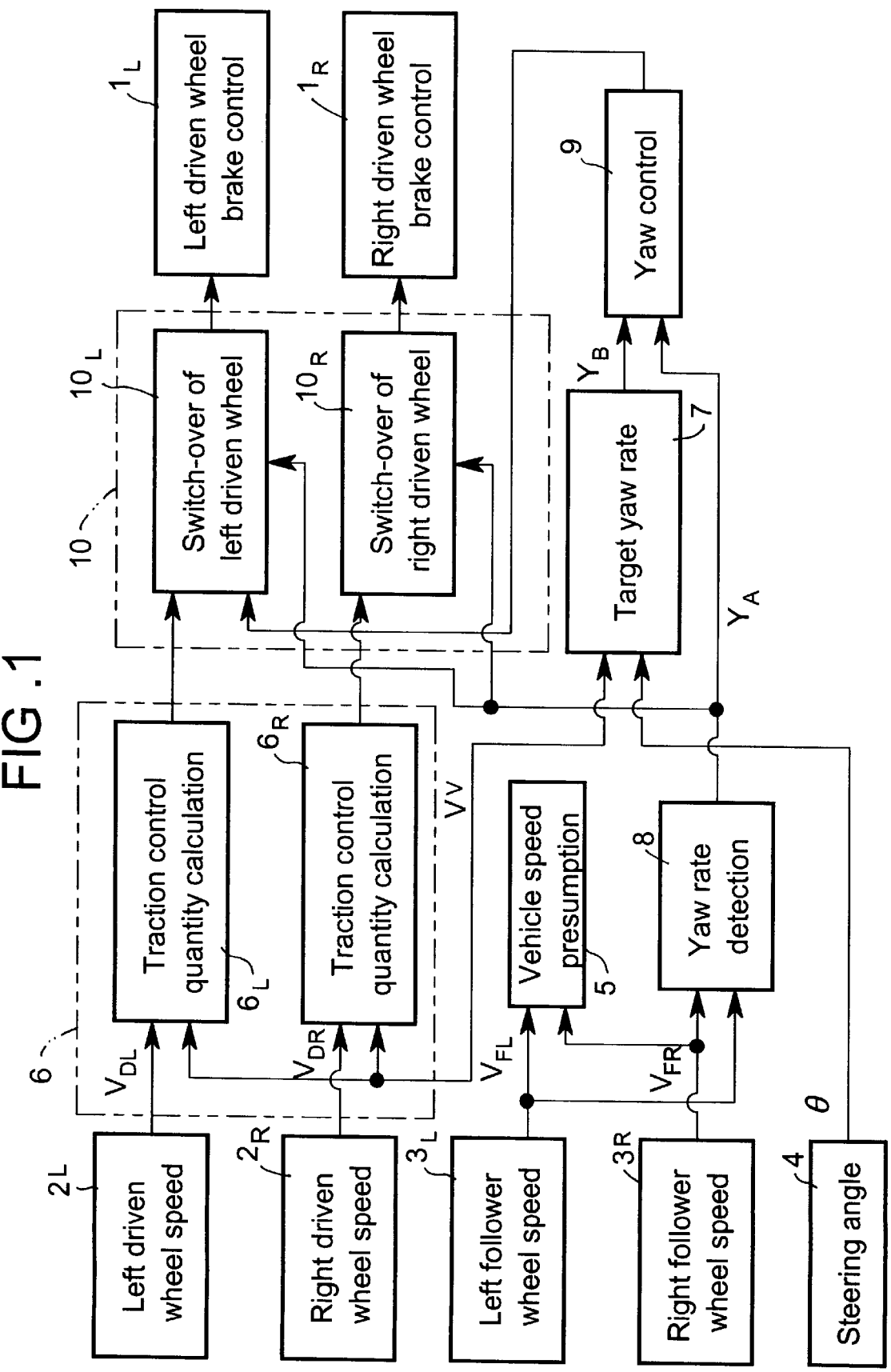
FIG. 1 is a block diagram illustrating a brake control system for carrying out brake control during non-braking according to the preferred embodiment of the present invention.

Referring first to FIG. 1, during non-braking of a vehicle, yaw control or traction control of the vehicle is carried out by operation of a left driven-wheel brake (not shown) which is controlled by a left driven-wheel brake control means $1_L$ or operation of a right driven-wheel brake (not shown) which is controlled by a right driven-wheel brake control means $1_R$. The brake control system for carrying out yaw control or traction control during non-braking of the vehicle includes a left driven-wheel speed detecting means $2_L$ and a right driven-wheel speed detecting means $2_R$ for detecting the left driven-wheel speed $V_{DL}$, and the right driven-wheel speed $V_{DR}$, respectively. A left follower-wheel speed detecting means $3_L$, and a right follower-wheel speed detecting means $3_R$ detect the left follower-wheel speed $V_{FL}$ and the right follower-wheel speed $V_{FR}$, respectively. A steering angle detecting means 4 detects the steering angle θ. The system further includes a vehicle speed calculating means 5 for calculating a vehicle speed $V_V$, a traction control means 6, a target yaw rate determining means 7 for determining a target yaw rate $Y_B$ of the vehicle, a yaw rate detecting means 8 for detecting an actual yaw rate of the vehicle, and a yaw control means 9. A selecting means 10 preferentially selects the yaw rate control means 9 over the traction control means 6 to connect it to the left driven-wheel brake control means $1_L$ or the right driven-wheel brake control means $1_R$.

In the vehicle speed calculating means 5, the left follower-wheel speed $V_{FL}$ detected by the left follower-wheel speed detecting means $3_L$ and the right follower-wheel speed $V_{FR}$ detected by the right follower-wheel speed detecting means $3_R$ are averaged, and the average value of the left and right follower-wheel speeds $V_{FL}$ and $V_{FR}$ is outputted as a vehicle speed $V_V$ from the vehicle speed calculating means 5.

The traction control means 6 includes a left driven-wheel traction control quantity calculating section $6_L$ and a right driven-wheel traction control quantity calculating section $6_R$. In the calculating sections $6_L$ and $6_R$, a slip tendency for a driven wheel is determined by comparison of a reference wheel speed based on the vehicle speed $V_V$ calculated in the vehicle speed calculating means 5 with the corresponding driven-wheel speed $V_{DL}$ or $V_{DR}$. The operational control quantities for driven-wheel brakes corresponding to a PID calculation are determined based upon the comparison result.

In the target yaw rate determining means 7, the target yaw $Y_B$ is a reference for a yaw rate which should be generated when steering is at a certain steering angle and vehicle speed. The target yaw $Y_B$ is determined in accordance with the vehicle speed $V_V$ determined in the vehicle speed calculating means 5 and the steering angle θ detected by the steering angle detecting means 4. In the yaw rate detecting means 8, an actual yaw rate $Y_A$ is calculated by multiplying the difference between the left and right follower-wheel speeds $V_{FL}$ and $V_{FR}$ detected by the left and right follower-wheel speed detecting means $3_L$ and $3_R$, by predetermined constants corresponding to the treads on the left and right follower wheels. Moreover, the yaw rate $Y_A$ is determined so that it is a positive value during rightward turning of the vehicle and a negative value during leftward turning of the vehicle.

In the yaw rate control means 9, the PID calculation is carried out so that a deviation between the target yaw rate $Y_B$ determined in the target yaw rate determining means 7 and the actual yaw rate $Y_A$ detected by the yaw rate detecting means 8 falls within a predetermined range. A control quantity for operating the driven-wheel brake for the outer one of the left and right driven wheels during turning of the vehicle is determined based on the result of the PID calculation.

The selecting means 10 includes a left driven-wheel switching section $10_L$ and a right driven-wheel switching section $10_R$. The control quantity calculated in the left driven-wheel traction control quantity calculating section $6_L$ and the control quantity determined in the yaw rate control means 9 as well as the actual yaw rate $Y_A$ detected by the yaw rate detecting means 8 are applied to the left driven-wheel switching section $10_L$. The control quantity calculated in the right driven-wheel traction control quantity calculating section $6_R$ and the control quantity determined in the yaw rate control means 9 as well as the actual yaw rate $Y_A$ detected by the yaw rate detecting means 8 are applied to the right driven-wheel switching section $10_R$. The left driven-wheel switching section $10_L$, when the control quantity from the yaw rate control means 9 is applied thereto, applies the control quantity from the yaw rate control means 9 to the left driven-wheel brake control means $1_L$, if the actual yaw rate $Y_A$ from the yaw rate detecting means 8 has a positive value (during rightward turning of the vehicle). However, the left driven-wheel switching section $10_L$ forcibly brings the control quantity from the yaw rate control means 9 to "0" to apply it to the left driven-wheel brake control means $1_L$, if the actual yaw rate $Y_A$ has a negative value (during leftward turning of the vehicle). The control quantity calculated in the left driven-wheel traction control quantity calculating section $6_L$ is applied to the left driven-wheel brake control means $1_L$ via the left driven-wheel switching section $10_L$, only when the control quantity from the yaw rate control means is not applied thereto. The right driven-wheel switching section $10_R$, when the control quantity from the yaw rate control means 9 is applied thereto, applies the control quantity from the yaw rate control means 9, to the right driven-wheel brake control means $1_R$, if the actual yaw rate $Y_A$ inputted from the yaw rate detecting means 8 has a negative value (during leftward turning of the vehicle). However, the right driven-wheel switching section $10_R$ forcibly brings the control quantity from the yaw rate control means 9 to "0" to apply it to the right driven-wheel brake control means $1_R$, if the actual yaw rate $Y_A$ has a positive value (during rightward turning of the vehicle). The control quantity calculated in the right driven-wheel brake control quantity calculating section $6_R$ is applied to the right driven-wheel brake control means $1_R$ via the right driven-wheel switching section $10_R$, only when the control quantity from the yaw rate control means 6 is not applied thereto.

In other words, the selecting means 10 selects the brake operation provided by the yaw rate control means 9 in preference to the brake operation provided by the traction control means 6. In carrying out the brake operation by the yaw rate control means 9, the brake for the outer one of the driven wheels, during turning of the vehicle, is operated.

Figure 2:
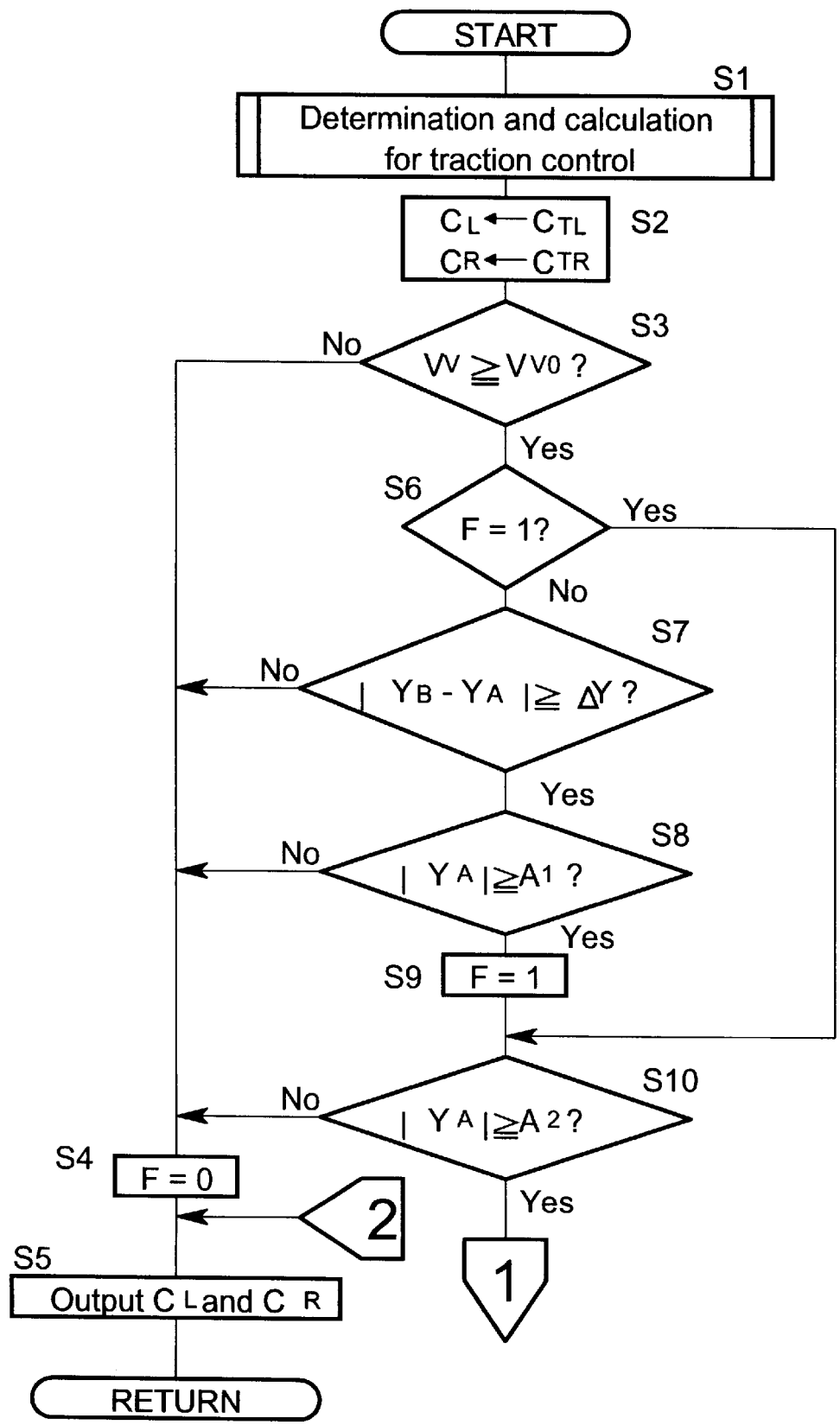
FIG. 2 is a flow chart illustrating a portion of the procedure for carrying out the brake control.
Figure 3:
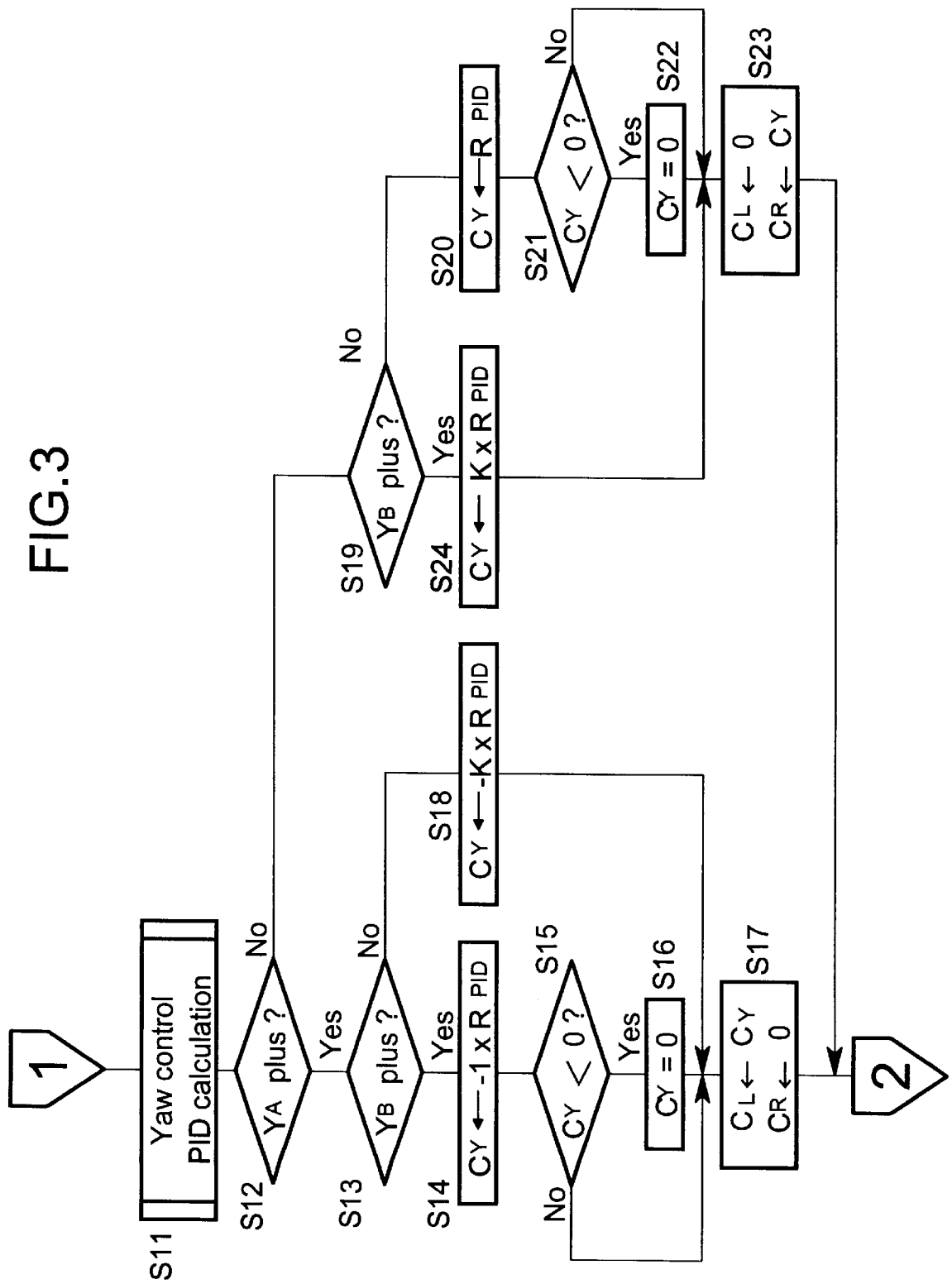
FIG. 3 is a flow chart illustrating the remaining portion of the procedure for carrying out the brake control.

The control procedure during non-braking by the brake control system is shown in FIGS. 2 and 3. Referring first to FIG. 2, at Step S1, the PID calculation based on the determination of a slip tendency of the driven wheels is carried out by the traction control means 6. At Step S2, left and right wheel control quantities $C_{TL}$ and $C_{TR}$ for the traction control determined by the PID calculation are defined as control quantities $C_L$ and $C_R$ of the left and right driven-wheel brake control means $1_L$ and $1_R$.

At Step S3, it is determined whether the vehicle speed $V_V$ is equal to or higher than a preset speed $V_{V0}$. If it is determined that the vehicle speed $V_V$ is lower than the preset speed $V_{V0}$, a flag F indicating whether the yaw control is being conducted is reset at Step S4 and then, the brake control quantities $C_L$ and $C_R$ for the left and right driven wheels are outputted at Step S5.

If it is determined at Step S3 that the vehicle speed $V_V$ is equal to or higher than the preset speed $V_{V0}$, it is determined at Step S6 whether the flag F has been set, i.e., whether yaw control is being conducted. If F=0 (the flag is in a reset state), the processing is advanced to Step S7. If F=1 (the flag F is in a set state), the processing is advanced to Step S10 bypassing Steps S7 to S9.

At Step S7, it is determined whether the absolute value $|Y_B-Y_A|$ of a value resulting from the subtraction of the actual yaw rate $Y_A$ from the target yaw rate $Y_B$, is equal to or greater than a preset deviation value $\Delta Y$. If $|Y_B-Y_A|\geq\Delta Y$, the processing is advanced to Step S8. If $|Y_B-Y_A|<\Delta Y$, the processing is advanced to Step S4. At Step S8, it is determined whether the absolute value $|Y_A|$ of the actual yaw rate $Y_A$ is equal to or greater than a first preset value $A_1$. If $|Y_A|\geq A_1$, the processing is advanced to Step S9. If $|Y_A|<A_1$, the processing is advanced to Step S4. At Step S9, the flag F is set.

Steps S7 to S9 are steps for determining whether yaw control should be started. Conditions established for starting yaw control are that the absolute value of the deviation between the target yaw rate $Y_B$ and the actual yaw rate $Y_A$ is equal to or greater than the preset deviation value $\Delta Y$, and the absolute value of the actual yaw rate $Y_A$ is equal to or greater than the first preset value $A_1$.

At Step S10, it is determined whether the absolute value $|Y_A|$ of the actual yaw rate $Y_A$ is equal to or greater than a second preset value $A_2$. If $|Y_A|\geq A_2$, the processing is advanced to Step S11, and if $|Y_A|<A_2$, the processing is advanced to Step S4.

Step S10 is a step for determining whether the yaw control should be stopped. A condition established for stopping the yaw control is that the absolute value of the actual yaw rate $Y_A$ is smaller than the second preset value $A_2$. The second preset value $A_2$ is defined as a value different from the first preset value $A_1$, and for example, $A_1>A_2$.

If it is determined at Step S10 that the yaw control is not complete, then the PID calculation based on the deviation between the target yaw rate $Y_B$ and the actual yaw rate $Y_A$ is carried out at Step S11, thereby providing a PID calculation value $R_{PID}$.

At Step S12, it is determined whether the actual yaw rate $Y_A$ is a positive value, i.e., whether the vehicle is in a rightward turning state. If the vehicle is in the rightward turning state, it is determined at Step S13 whether the target yaw rate $Y_B$ is a positive value. If both of the actual yaw rate $Y_A$ and the target yaw rate $Y_B$ are positive values, i.e., the vehicle is in the rightward turning state, a value of the PID calculation value $R_{PID}$ with a "−" sign affixed thereto is determined as a yaw rate control quantity $C_Y$. When $Y_A>Y_B$, the PID calculation value $R_{PID}$ has a negative value and hence, the yaw rate control quantity $C_Y$ has a positive value as a result of the affixing of the "−" sign.

At the next Step S15, it is determined whether $C_Y<0$. If $C_Y<0$, i.e., $Y_A<Y_B$, the yaw rate control quantity $C_Y$ is set to 0 (zero) at Step S16, proceeding to Step S17. If $C_Y>0$, the processing is advanced to Step S17 to bypass Step S16.

At Step S17, both of the control quantities $C_L$ and $C_R$ are set to 0 (zero) in order to brake the left driven wheel which is an outer wheel during rightward turning of the vehicle, and then, the processing is advanced to Step S5 shown in FIG. 2.

If it is determined at Step S13 that the target yaw rate $Y_B$ has a negative value, i.e., the directions of the actual and target yaw rates $Y_A$ and $Y_B$ are opposite from each other, then the PID calculation value $R_{PID}$ is multiplied by a constant k, and a value having a "−" sign affixed thereto is set as the yaw control quantity $C_Y$, proceeding to Step S17. Here, the constant k is a value smaller than "1", and if $Y_A$ has a positive value, and $Y_B$ has a negative value, the PID calculation value $R_{PID}$ has a negative value. Therefore, in a state in which the PID calculation value $R_{PID}$ is constant, the yaw control quantity $C_Y$ determined at Step S18 assumes a positive value smaller than the yaw control quantity $C_Y$ determined at Step S14.

Steps S12 to S18 ensure, based on the assumption that the deviation between the target and actual yaw rates $Y_B$ and $Y_A$ is constant when the vehicle is in the rightward turning state, the yaw control quantity $C_Y$ is determined at a smaller value when the directions of the target and actual yaw rates $Y_B$ and $Y_A$ are opposite from each other, than when the directions of the target and actual yaw rates $Y_B$ and $Y_A$ are the same. When $Y_A<Y_B$, even if the directions of the target and actual yaw rates $Y_B$ and $Y_A$ are the same, the yaw control quantity $C_Y$ is forcibly set to "0", thereby ensuring that the brake control is not carried out.

If it is determined at Step S12 that the actual yaw rate $Y_A$ is a negative value, i.e., if it is determined that the vehicle is in a leftward turning state, it is determined at Step S19 whether the target yaw rate $Y_B$ has a positive value. If both of the target and actual yaw rates $Y_B$ and $Y_A$ are negative, i.e., the vehicle is in the leftward turning state, the PID calculation value $R_{PID}$ is set, as the yaw control quantity $C_Y$ at Step S20. When $Y_A<Y_B$, the PID calculation value $R_{PID}$ assumes a positive value and hence, the yaw control quantity $C_Y$ assumes a negative value.

At next Step S21, it is determined whether $C_Y<0$. If $C_Y<0$, i.e., $Y_A>Y_B$, the yaw control quantity $C_Y$ is set to 0 at Step S22, proceeding to Step S23. If $C_Y>0$, the processing is advanced to Step S23 to bypass Step S22.

At Step S23, the control quantity $C_L$ is set to 0 and the control quantity $C_R$ is set to be equal to $C_Y$, in order to brake the right driven wheel which is an outer wheel during leftward turning of the vehicle and then, the processing is advanced to Step S5 shown in FIG. 2.

If it is determined at Step S19 that the target yaw rate $Y_B$ has a positive value, i.e., the directions of the actual and target yaw rates $Y_A$ and $Y_B$ are opposite from each other, a value resulting from multiplication of the PID calculation value $R_{PID}$ by the constant k is set as a yaw control quantity $C_Y$ at Step S24, proceeding to Step S23. The yaw control quantity $C_Y$ provided at Step S24 in the above manner assumes a positive value smaller than the yaw control quantity $C_Y$ provided at Step S20 in a state in which the PID calculation value $R_{PID}$ is constant.

Steps S19 to S24 ensure, that on the assumption that the deviation between the target and actual yaw rates $Y_B$ and $Y_A$ is constant, when the vehicle is in a leftward turning state, the yaw control quantity $C_Y$ is determined at a smaller value when the directions of the target and actual yaw rates $Y_B$ and $Y_A$ are opposite from each other, than when the directions of the target and actual yaw rates $Y_B$ and $Y_A$ are the same. When $Y_B < Y_A$ even if the directions of the target and actual yaw rates $Y_B$ and $Y_A$ are the same, the yaw control quantity $C_Y$ is forcibly set to "0", ensuring that the brake control is not carried out.

The operation of this embodiment will be described below with reference to FIG. 4. When the actual yaw rate $Y_A$ is largely varied due to an external disturbance such as a variation in friction coefficient of a road surface, a crosswind or a rut on the road surface at a time $t_1$ in a condition in which the absolute value of the target yaw rate $Y_B$ is equal to or greater than the first preset value $A_1$ in response to a variation in steering angle θ, the brake operation of the driven wheel brake for an outer wheel during turning of the vehicle is started at a time $t_2$ when the absolute value $|Y_B - Y_A|$, a value resulting from the subtraction of the actual yaw rate $Y_A$ from the target yaw rate $Y_B$, becomes equal to or greater than the preset deviation value ΔY. This causes the braking pressure for and the wheel speed of the outer wheel to be varied, whereby the variation in yaw rate $Y_A$ can be inhibited and the vehicle can be prevented from becoming unstable, although the yaw rate $Y_A'$ is large when the brake control is not carried out.

Moreover, notwithstanding that the brake control of the driven wheels by the traction control means 6 is feasible during non-braking, the brake control of the driven wheels by the yaw control means 9 is preferentially carried out and hence, the interference of both the controls with each other cannot occur even if both controls are possible for the same wheel.

In starting the brake control by the yaw control means 9, it is necessary to meet both of the conditions that (1) the absolute value of the deviation between the target and actual yaw rates $Y_B$ and $Y_A$ is equal to or greater than the preset deviation value ΔY, and (2) the absolute value of the actual yaw rate $Y_A$ is equal to or greater than the first preset value $A_1$. Therefore, the frequency of the brake operation can be decreased and moreover, the necessary yaw control can be reliably performed. More specifically, in a so-called plow state in which the directions of the actual and target yaw rates $Y_A$ and $Y_B$ are opposite from each other, the deviation between the target and actual yaw rates $Y_B$ and $Y_A$ is large, but when a driver makes an attempt to apply a counter-steering, the value of the actual yaw rate may be increased in a relatively small number of situations, and when the value of the actual yaw rate $Y_A$ is smaller, the frequency of the brake operation can be decreased due to the fact that the yaw control is not carried out. On the other hand, when the vehicle is turning with a relatively large yaw rate $Y_A$ due to a relatively high friction coefficient of a road surface, it is desirable to conduct the brake operation immediately when a spinning tendency is produced. In this case, the value of the actual yaw rate $Y_A$ is sufficiently large and hence, if only a deviation condition in which the absolute value $|Y_B - Y_A|$ is equal to or greater than a preset value, the yaw control by the brake operation can be conducted immediately.

Further, when the absolute value of the actual yaw rate $Y_A$ is larger than the absolute value of the target yaw rate $Y_B$, in the state in which the directions of the target and actual yaw rates $Y_B$ and $Y_A$ are the same, it is necessary to apply a large counter moment in opposition to the summing-up of the moments due to the same turning directions. In contrast, in the state in which the directions of the target and actual yaw rates $Y_B$ and $Y_A$ are opposite from each other, a relatively small counter moment may be applied as a result of the partial offset of moments due to the opposite turning directions. Thus, in the brake control adapted for the driven state of the vehicle, the yaw control quantity $C_Y$ is determined at the smaller value when the directions of the target and actual yaw rates $Y_B$ and $Y_A$ are opposite from each other, than when the directions of the target and actual yaw rates $Y_B$ and $Y_A$ are the same on the assumption that the deviation between the target and actual yaw rates $Y_B$ and $Y_A$ is constant.

As described above, the conditions for starting the brake control by the yaw control means 9 are that the absolute value of the deviation between the target and actual yaw rates $Y_B$ and $Y_A$ is equal to or greater than the preset deviation value ΔY and the absolute value of the actual yaw rate $Y_A$ is equal to or greater than the first preset value. The condition for stopping the brake control is only that the actual yaw rate $Y_A$ is smaller than the second preset value $A_2$, and it is not a condition for stopping the brake control that the absolute value of the deviation between the target and actual yaw rates $Y_B$ and $Y_A$ is smaller than the preset deviation value. By the establishment of such conditions, it is possible to advance the timing of the start of the brake control when the steering characteristic has been changed from a strong under-steering state to an over-steering state on a road surface of a low friction coefficient such as on snow or ice.

On the assumption that the actual and target yaw rates $Y_A$ and $Y_B$ have been changed as shown in FIG. 5, when $|Y_A| \geq A_1$ is established at a time point $t_2'$ after a lapse of a time from a time point $t_1'$ when the $|Y_B - Y_A| \geq \Delta Y$ has been established, the conditions for starting the brake control by the yaw control means 9 is established at this time point $t_2'$, and the flag is set. However, because $Y_B > Y_A$, the yaw control quantity $C_Y$ has been forcibly set to "0" and hence, the brake control is not carried out. If the steering angle is increased at a time point $t_3'$ by the vehicle's driver because of the strong under-steering state, the operational state is quickly changed to an over-steering state at and after the time point $t_3'$. When $Y_A > Y_B$ is established at a time point $t_4'$, the brake control is started in response to the yaw control quantity $C_Y$ assuming a positive value. In contrast, when the condition for stopping the control is that absolute value of the deviation between the target and actual yaw rates $Y_B$ and $Y_A$ is smaller than the preset deviation value, the condition for stopping the control is established and the flag F is reset at the time point $t_4'$, and the flag F is reset at a time point $t_5'$ at which the absolute value of the deviation between the target and actual yaw rates $Y_B$ and $Y_A$ is equal to or greater than the preset deviation value ΔY, thereby starting the brake control. Thus, the timing of the start of the brake control is retarded.

In a alternative embodiment, the brake for the follower wheel which is an outer wheel during turning of the vehicle, may be operated by the yaw control means 9.

Although the embodiment of the present invention has been described in detail, it will be understood that the present invention is not limited to the above-described embodiment, and various modifications in design may be made without departing from the spirit and scope of the invention defined in claims.

What is claimed is:

1. A brake control system for a vehicle, comprising:

a target yaw rate determining means for determining a target yaw rate of the vehicle;

a yaw rate detecting means for detecting an actual yaw rate of the vehicle; and a yaw control means for operating a wheel brake for an outer wheel, during turning of the vehicle, based upon the deviation between the target yaw rate determined in said target yaw rate determining means and the actual yaw rate detected by said yaw rate detecting means, where the brake operation is started when the absolute value of the deviation between said target and actual yaw rates is equal to or greater than a preset deviation value and the absolute value of said actual yaw rate is equal to or larger than a preset value, and wherein the brake control does not occur when the direction of the actual yaw rate is the same as that of the target yaw rate and the actual yaw rate is smaller than the target yaw rate.

2. A brake control system for a vehicle according to claim 1, wherein said yaw control means operates the wheel brake for the outer wheel, during turning of the vehicle, to stop the brake operation when the absolute value of the actual yaw rate detected by said yaw rate detecting means is smaller than a preset value.

3. A brake control system for a vehicle, comprising:

a target yaw rate determining means for determining a target yaw rate of the vehicle;

a yaw rate detecting means for detecting an actual yaw rate of the vehicle; and a yaw control means for operating a wheel brake for an outer wheel, during turning of the vehicle, based upon the deviation between the target yaw rate determined in said target yaw rate determining means and the actual yaw rate detected by said yaw rate detecting means, and for determining a brake operation control quantity with respect to said deviation at a value which is smaller when the directions of the target and actual yaw rates are opposite from each other, than when the directions of the target and actual yaw rates are the same, and for preventing operation of the wheel brake when the direction of the actual yaw rate is the same as that of the target yaw rate and the actual yaw rate is smaller than the target yaw rate.

* * * * *